United States Patent [19]

McMurray

[11] Patent Number: 5,489,991

[45] Date of Patent: Feb. 6, 1996

[54] METHOD FOR GENERATING DIGITAL HALFTONE IMAGES

[75] Inventor: Timothy J. McMurray, San Jose, Calif.

[73] Assignee: International Business Machines Corporation, Armonk, N.Y.

[21] Appl. No.: 959,314

[22] Filed: Oct. 9, 1992

[51] Int. Cl.⁶ .................................................. H04N 1/40
[52] U.S. Cl. ........................ 358/456; 358/455; 358/283
[58] Field of Search .................................... 358/133, 260, 358/138, 456, 240, 230, 283, 284, 533, 462, 457, 456, 455, 500, 262.1, 429–430; 382/8, 9, 55

[56] References Cited

U.S. PATENT DOCUMENTS

| | | | |
|---|---|---|---|
| 4,193,096 | 3/1980 | Stoffel | 358/260 |
| 4,449,150 | 5/1984 | Kato | 358/283 |
| 4,473,829 | 8/1984 | Schouhamer et al. | 346/1.1 |
| 4,486,785 | 12/1984 | Lasher et al. | 358/284 |
| 4,531,160 | 7/1985 | Ehn | 358/240 |
| 4,651,293 | 3/1987 | Kato | 364/602 |
| 4,654,721 | 3/1987 | Goertzel et al. | 358/283 |
| 4,700,235 | 10/1987 | Gall | 358/283 |
| 4,706,077 | 11/1987 | Roberts et al. | 340/728 |
| 4,736,254 | 4/1988 | Kotera et al. | 358/283 |
| 4,766,499 | 8/1988 | Inuzuka | 358/283 |
| 4,783,837 | 11/1988 | Kawamura et al. | 382/50 |
| 4,800,443 | 1/1989 | Crinon et al. | 338/280 |
| 4,803,558 | 2/1989 | Hiratsuka et al. | 358/283 |
| 4,823,189 | 4/1989 | Haines et al. | 358/283 |
| 4,910,603 | 3/1990 | Hirahara et al. | 358/298 |

(List continued on next page.)

FOREIGN PATENT DOCUMENTS

| | | |
|---|---|---|
| 60-125066 | 7/1985 | Japan . |
| 60-253369 | 12/1985 | Japan . |
| 1252064 | 10/1989 | Japan . |
| 2260972 | 10/1990 | Japan . |
| 330574 | 2/1991 | Japan . |

OTHER PUBLICATIONS

R. Ulichney, "Digital Halftoning", MIT Press, Cambridge, Massachusetts, pp. 85–87.
R. Rubinstein, "Digital Typography: An Introduction to Type and Composition for Computer System Design", Addison–Wesley Publishing Company, pp. 83–87.
P. Stucki, "Advances in Digital Image Processing: Theory Application, Implementation, IBM Zurich Research Laboratory", Plenum Press, New York & London, pp. 201–204.
S. Wakabayashi, "Halftoning Algorithm with Data Encoding", IBM Technical Disclosure Bulletin, vol. 31 No. 6, Nov. 1988, IBM Corporation, pp. 180–183.
S. Ishikawa et al., "Pyramid Error Diffusion Algorithm for Halftoned Image", IBM Technical Disclosure Bulletin, vol. 30, No. 9, Feb. 1988, IBM Corporation, pp. 191–194.

*Primary Examiner*—Paul Ip
*Attorney, Agent, or Firm*—Baker, Maxham, Jester & Meador

[57] ABSTRACT

A computer-implemented method generates digital halftone matrices of selected size for use in an image processing system in which bi-level images are formed from continuous tone input images using the digital halftone matrices. In accordance with the method, a two-dimensional array of storage positions is defined for storing values. The two-dimensional array is divided into four quadrants of equal size, each quadrant having a quadrant origin, a quadrant perimeter and four subquadrants disposed around the quadrant origin. The storage positions of a first pair of diagonal quadrants are assigned threshold values arranged in order of increasing magnitude from the quadrant origin toward the quadrant perimeter completing concentric squares of threshold values as the magnitude increases. The storage positions of a second pair of diagonal quadrants are assigned threshold values arranged in order of increasing magnitude from the quadrant perimeter toward the quadrant origin completing concentric squares of threshold values as the magnitude increases. Each quadrant has threshold values arranged in alternating pairs diagonally opposing subquadrants to provide bi-lateral symmetry.

31 Claims, 8 Drawing Sheets

U.S. PATENT DOCUMENTS

| | | | |
|---|---|---|---|
| 4,914,524 | 4/1990 | Kimura | 358/462 |
| 4,928,187 | 5/1990 | Rees | 360/40 |
| 4,937,761 | 6/1990 | Hassett | 364/518 |
| 4,943,869 | 7/1990 | Horikawa et al. | 358/426 |
| 4,955,065 | 8/1990 | Ulichney | 382/50 |
| 4,965,843 | 10/1990 | Van Dorsselaer | 382/50 |
| 4,969,052 | 11/1990 | Ishida et al. | 358/457 |
| 4,975,786 | 12/1990 | Katayama et al. | 358/459 |
| 4,992,955 | 2/1991 | Yabuuchi et al. | 364/518 |
| 5,016,191 | 5/1991 | Radochonski | 364/518 |
| 5,053,887 | 10/1991 | Thompson | 358/457 |
| 5,226,115 | 7/1993 | Fiasconaro | 395/141 |
| 5,264,926 | 11/1993 | Rylander | 358/500 |
| 5,272,763 | 12/1993 | Maruyama et al. | 382/8 |
| 5,283,664 | 2/1994 | Fujisawa et al. | 358/429 |
| 5,291,309 | 3/1994 | Semasa | 358/455 |
| 5,341,227 | 8/1994 | Kumashiro | 358/533 |
| 5,361,142 | 11/1994 | Semasa | 358/455 |

METHOD FOR GENERATING DIGITAL HALFTONE IMAGES

BACKGROUND OF THE INVENTION

The present invention relates generally to bi-level imaging, and more particularly to the generation of bi-level digital halftone images using threshold or "dither" matrices.

Pseudo-halftoning is a form of bi-level imaging which is used to represent continuous tone black and white or color images having, for example, areas of black, white and shades of gray (halftones) using only two output levels. The two output levels are no color (e.g. black) and color (e.g. white). With bi-level printing, shades of gray are represented by areas of dots, the size and number of which determine how gray a particular area is perceived by the human eye. The centers of the dots are usually aligned in a regular screen pattern.

Optical halftoning is used conventionally in lithography and photo-engraving. Black and white pictures in a newspaper are printed using optical halftoning and this screen pattern can be seen with a magnifying glass. When a pseudo-halftone negative is made from a continuous-tone copy, a halftone screen, such as an out-of-focus pattern of diffused dots and corresponding spaces, is placed in the light path between the camera lens and a sheet of high-contrast photographic film. The basic function of the halftone screen and the high-contrast photographic film is to create a diffraction pattern on the photographic film. The size of each spot on the film represents the average intensity of a small region in the original image. This process thus converts the halftones of the original continuous-tone copy into solid spots of equal density but varying size. As the intensity of the reflected light increases from shadows to highlights, the halftones of the continuous-tone copy produce intermediate size spots (pseudo-halftones) which the human eye perceives as shades of gray.

In digital halftoning the optical halftone screen is eliminated. Instead, numeric values representing the intensity at each picture element (PEL) of an input image are compared with a threshold value in order to make a black or white decision. A technique known as "spatial dithering" utilizes a variable-level threshold mask or dither matrix representing a two dimensional array of PEL storage positions, each containing an intensity threshold value. The term "dither" refers to the fact that the threshold values change from one position to the next, a technique which dramatically improves image quality over systems using only a single threshold value. To produce the bi-level image, the values in the threshold matrix storage positions are tested against corresponding PELs in the continuous tone input image. By use of the term "corresponding", it will be understood that a PEL from an input image may be tested against only one storage position in a threshold matrix, a sub-area of the matrix, an entire matrix, or a tiled area of the matrices. Each input PEL having an intensity value exceeding a corresponding value in the threshold matrix is printed. This printing produces an output image formed from a plurality of printed PEL patterns whose shape and size form a bi-level image corresponding to the original continuous tone image.

A technique known as ordered dithering is implemented by dividing the total input image area into a regular pattern of unit areas corresponding in size to, e.g., a single threshold or dither matrix. Each unit area includes a plurality of PELs (e.g. 256), but at typical printer resolutions on the order of 240 PELs per inch, the unit areas are very small and difficult to discern individually without magnification. A threshold matrix can be used like a small tile that covers each unit area of the input image and is repeated horizontally and vertically to compare the matrix threshold values with the intensity in each unit area. This comparison may be done with only a sub-area of the matrix, if necessary.

In ordered dithering, the manner in which the thresholding matrix is formed can have a dramatic effect on image quality. For example, the size of the thresholding matrix is proportional to the number of gray levels which can be represented, but is inversely proportional to image resolution and contrast. Image quality also depends on the arrangement of values in the threshold matrix. For example, high spatial resolution can be obtained by arranging the threshold values such that similar values are positioned as far as possible from one another in the threshold matrix. This arrangement results in a checker-board-like arrangement of PELs at intermediate intensity levels. The method, however, is susceptible to ink spread as when a printer cannot reliably deposit a single square PEL of ink. If a single PEL cannot be displayed or printed without spreading into an adjacent PEL position, the output will appear too dark. Also, since ink spreading does not produce a regular dot pattern, artifacts will be perceived in the image where dots happen to fall close together, especially when in vertical and horizontal rows. These are known as "worm" artifacts and can be quite distracting.

A method that compensates for ink spread is the "dot cluster" method. In this approach, similar threshold matrix values are arranged close to one another and so that increases of image intensity are represented by dot clusters of increasing size. This method of ordered dithering most closely simulates optical halftoning. Dot overlap is naturally compensated for such that the effects of ink spread are minimized.

Notwithstanding the advantages of the dot cluster method, the order in which the dot clusters are formed may significantly affect image quality. If the threshold matrices are not well balanced, and the order that the PELs are added to the dot clusters does not preserve symmetry, unevenly weighted dot clusters may be produced. For example, some threshold matrices are filled as spirals growing around a central point or filled as a rectangle from a side or a corner. This creates visually distracting shapes and patterns of dot clusters. Other matrices are filled in vertical and horizontal rows of dot clusters. Instead of perceived areas of different levels of gray, patterns are seen as vertical and horizontal rows of dots. This is particularly distracting because vertical and horizontal images are the orientations to which the human eye is most sensitive. The extent of this sensitivity is such that vertical and horizontal lines are perceived even when the lines are not true lines and are composed only of dashes or dots.

Thus, there is an evident need for a bi-level imaging method for producing black and white or color images wherein threshold matrices are provided to define dot clusters that are symmetrical and bi-laterally balanced, and wherein subjectively perceived horizontal and vertical lines, visually distracting shapes and patterns of dot clusters, and overly dark pictures resulting from dot spread are minimized. The method should further allow the formation of matrices of varying size in an efficient manner with minimal required processing time in order to adjust the range of intensity values that are resolved. For example, even though an input image is scanned so that eight bits are used to represent the intensity values, the actual values may range from 50 to 200 rather than the entire 256 level range possible with eight bits. In many situations, it is desirable to use a smaller matrix for the smaller range of actual values. Controlling matrix size may also be desirable in order to accommodate changes in input matrix size.

While there have been numerous prior art proposals relating to the formation of dither or threshold matrices, solutions satisfying the aforementioned objectives have not been forthcoming. For example, P. Stucki, "Advances In Digital Image Processing, Theory, Application, Implementation", pp. 201–214 (1979) discusses a digital halftone matrix based on clustered dot patterns. One such matrix is formed as an eight by eight array that includes four quadrants. There are two pairs of diagonally opposing quadrants having identical patterns. One pair of quadrants is filled outwardly from the quadrant centers while the other pair of quadrants is filled inwardly from the quadrant perimeters. The proposed matrix achieves a forty-five degree angle in the dot clusters and grows in a balanced and symmetrical manner. However, the size of the matrix is fixed and no procedure is defined for reproducing the matrix or to produce larger matrices. Moreover, dots are not consistently added in alternating subquadrant pairs. Accordingly, a threshold matrix overcoming the foregoing disadvantages and which is produced by a procedure permitting reproducibility and changes in matrix size would be desirable.

SUMMARY OF THE INVENTION

It is a primary object of the present invention to provide a computer-implemented method for generating digital halftone matrices of selected size for use in an image processing system in which black and white or color bi-level images are formed from clustered dot patterns using the digital halftone matrices. In accordance with the invention, a two-dimensional array of storage positions is defined for storing threshold values of a digital halftone matrix to be generated. The two-dimensional array is divided into four quadrants of equal size, each quadrant having a quadrant origin, a quadrant perimeter and four subquadrants disposed around the quadrant origin. Each storage position of a first pair of diagonal quadrants is assigned a threshold value such that the threshold values are arranged in order of increasing magnitude from the quadrant origin toward the quadrant perimeter completing concentric squares of threshold values as the magnitude increases. Each storage position of a second pair of diagonal quadrants is assigned a threshold value such that the threshold values are arranged in order of increasing magnitude from the quadrant peripheral storage positions toward the quadrant central storage positions completing concentric squares as the magnitude increases. The threshold values are arranged in each quadrant in order of increasing magnitude in alternating pairs of diagonally opposing subquadrants to provide bi-lateral symmetry in each quadrant.

DETAILED DESCRIPTION OF THE PREFERRED EMBODIMENTS

The invention will now be described with reference to several preferred embodiments which will be understood as exemplary in nature and not limiting of the scope of the invention, which is defined solely in accordance with the spirit of the claims appended hereto.

Figure 1:
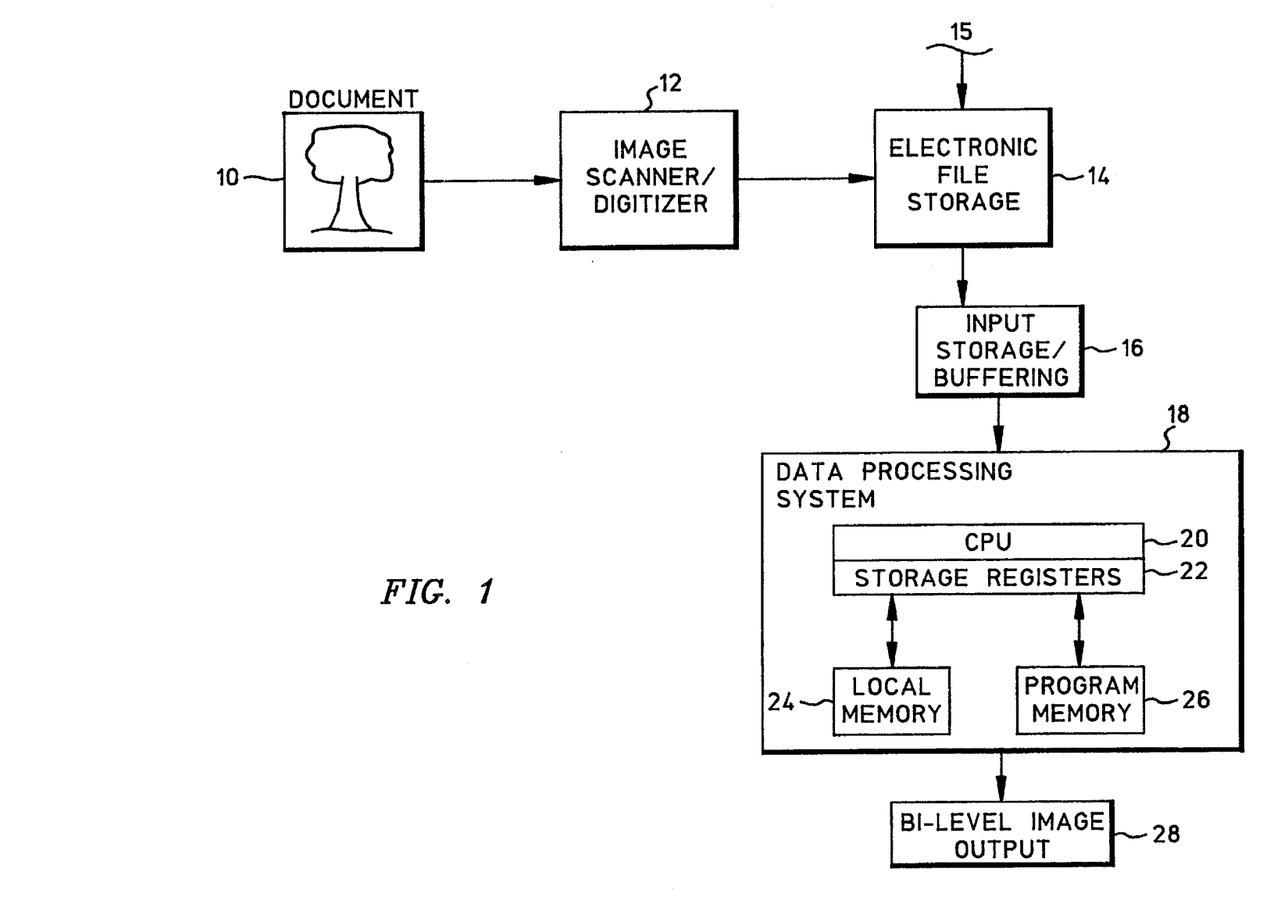
FIG. 1 is a block diagram of a data processing system constructed in accordance with the present invention.

Turning now to FIG. 1, a programmable data processing apparatus converts continuous tone color or black and white images into bi-level output images that are either color or black and white. The continuous tone input images may be presented as a hard copy document or an electronic document. A hard copy document represented by reference number 10 is input to the system by scanning and digitizing utilizing the image scanner/digitizer 12. As is conventional, the image scanner/digitizer scans the document 10 line by line in a left to right horizontal sweep pattern. As the document is scanned, the intensity of light reflected from its surface is quantized at discrete points to define an array of picture elements or PELs. Each PEL is assigned a digital value representing the relative brightness of the document at that point over a range of values whose end points represent no color (e.g. black) and color (e.g. white). The intensity values between the end points encompass various color shades (e.g. shades of gray) between the no color and the color end points. The array of intensity values generated by the image scanner/digitizer is stored as an electronic file in a storage device 14. The electronic store 14 also stores electronic documents provided from an input port 15, it being understood that electronic files including calculated image data will already be in a scanned format or scanner/digitizer format and that document scanning/digitizing is not required.

Input files representing continuous tone input images are presented for conversion to bi-level form by means of an input storage/buffering system 16 which is conventionally part of a data processing system 18. The data processing system 18 may be formed from any of a variety of general purpose computer devices including personal computers and workstations, mid-range and mainframe systems. At a very basic level, the systems have in common a central processing unit (CPU) 20, one or more storage registers 22, local processing memory 24 and program memory 26 for storing one or more executable programs, all of which is conventional.

The objective of bi-level conversion of an input image is to create a bi-level output image, shown in FIG. 1 by reference number 28. This output image can be produced on any known means appropriate to the application. Thus, reference numeral 28 may refer to a printer or a display device, each with an appropriate driver.

The objective is achieved by dividing the input image into subparts or units of multiple PELs and generating for each unit an output dot cluster corresponding in size to the average image intensity associated with the unit. To that end, the data processing system 18 receives an electronic file representing a continuous tone input image via the input storage/buffering unit 16. The input image is "thresholded" using a digital matrix filter or threshold matrix such as that shown in FIG. 2. The threshold matrix is generated and/or stored by the data processing system 18 as a two-dimensional array of storage positions having stored therein a plurality of threshold values (e.g. 256) whose size preferably forms a single image unit. The data processing system 18 is programmed to proceed unit by unit, comparing each of the threshold values of the threshold matrix with corresponding PELs of the input image unit. A first binary value is assigned for the input PELs that exceed the threshold value while a second binary value is assigned for the input PELs whose intensity value does not exceed the threshold value. The result of the above-described comparison is the formation of a dot cluster which is used to represent the intensity of a single input image unit. The resultant dot cluster is assigned a position in a bi-level output image corresponding to the center position of the corresponding unit of the input image. Successive dot clusters are added to the bi-level image line by line in a top-to-bottom direction using a left-to-right sweeping pattern, although other patterns could also be used. The threshold matrix is thus applied as a tile to successive input image units in order to generate the corresponding dot cluster outputs.

Figure 2:
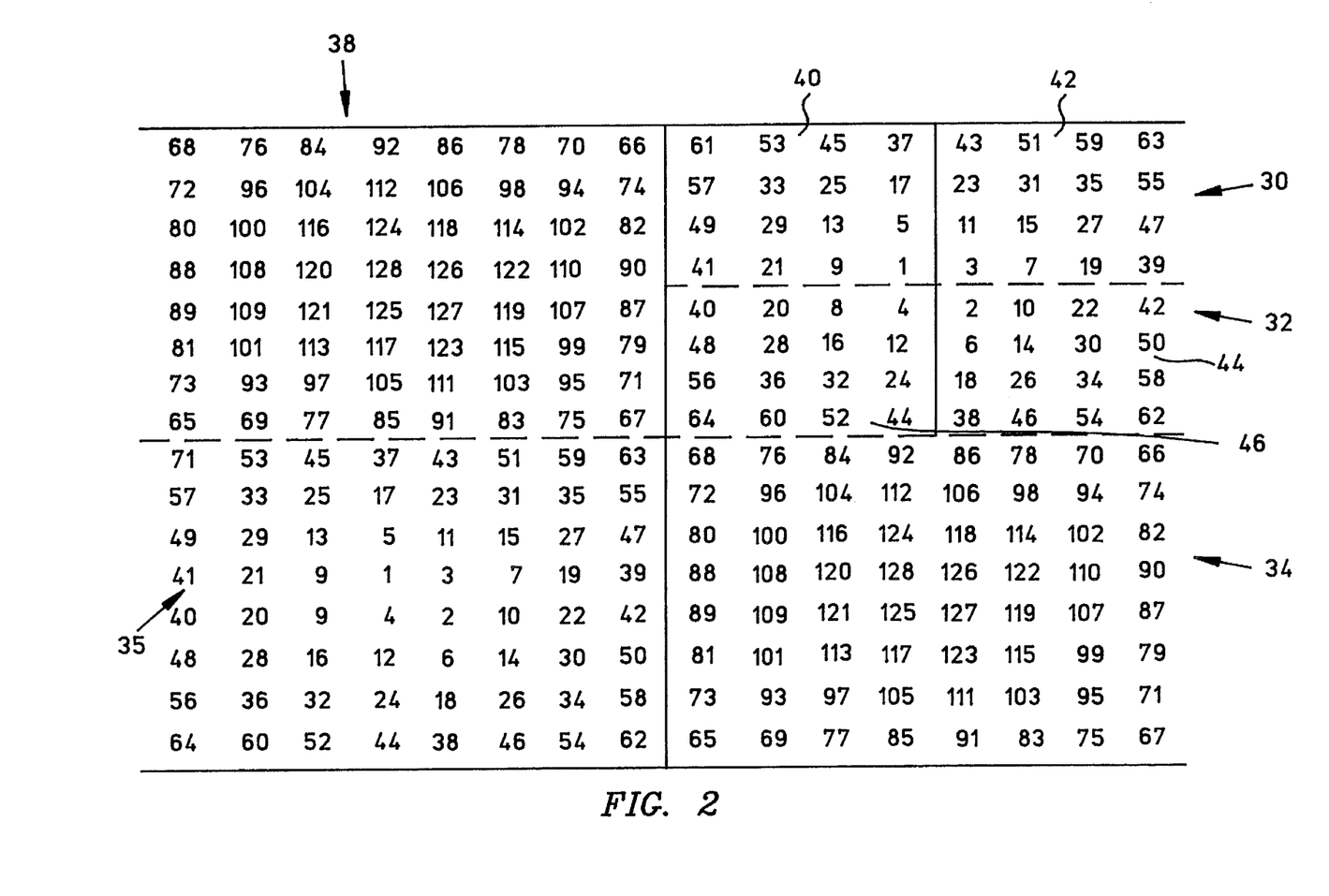
FIG. 2 is a 16×16 threshold matrix constructed in accordance with the present invention.
Figure 3:
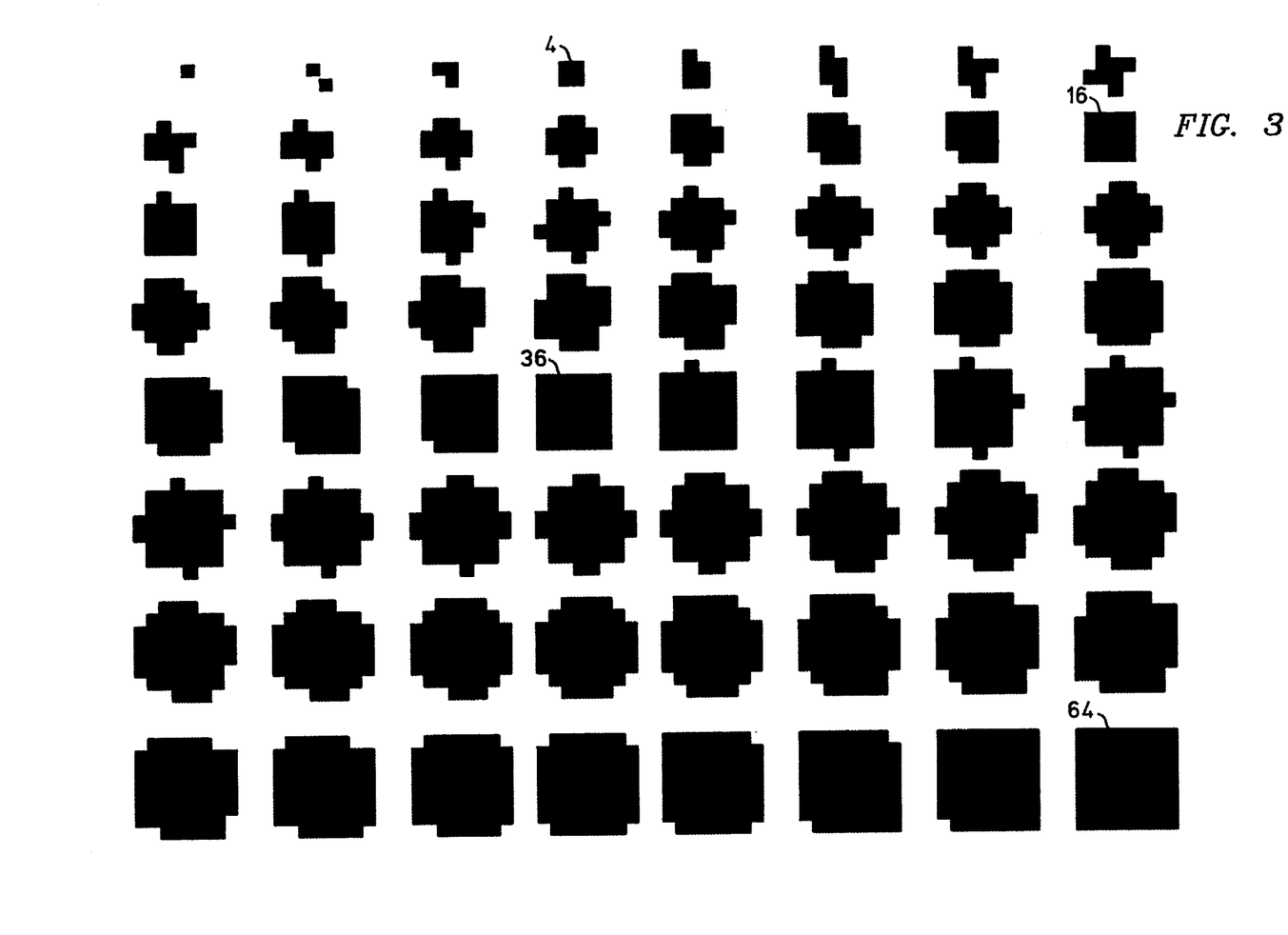
FIG. 3 shows a series of dot clusters of increasing size representing the intensity of a corresponding portion of a continuous-tone input image.

It will be seen from FIG. 2 that the threshold values of the threshold matrix 30 are arranged so that areas of increasing intensity in the input image are represented by dot clusters of increasing size. Moreover, in order to avoid the formation of visually distracting horizontal and vertical lines, the dot clusters are arranged to achieve a 45-degree angle of symmetry. The threshold matrix 30 is divided into four quadrants, 32, 34, 35 and 38 and dot clusters are simultaneously built in diagonally opposite quadrants. FIG. 3 illustrates the formation of a dot cluster corresponding to quadrant 32. The dot cluster grows as the intensity in the input image increases between the threshold values of 1 and 64 of the threshold matrix. Because the quadrant 35 is identical, a similar dot cluster will be generated for it. This means that two PELs are printed or displayed with each increment of color density or threshold value. Thus, the number of gray levels or densities that can be represented within a given matrix is half the number of elements in the matrix plus one for an empty matrix. For example, the 16×16 matrix of FIG. 2 has 256 elements. The number of different levels or dot clusters is half of that plus one or 129 levels. Similarly, the 12×12 matrix shown in FIG. 4 has 144 elements. The number of different levels is half of that plus one which is 73. Still further, the 8×8 matrix of FIG. 5 has 64 elements and 37 levels, while the 4×4 matrix of FIG. 6 has 16 elements and 9 levels. To continue the 45-degree angle as the dot clusters grow beyond the 50 percent level (a checker board of diagonally filled quadrants), the other pair of diagonally opposite quadrant are filled in reverse order (from the outside rather than the inside). The threshold values in these quadrants are simply the result of subtracting the first quadrant values from the total possible number of levels.

To achieve a well-balanced and symmetrical dot cluster growth pattern, each quadrant of the threshold matrix 30 of FIG. 2 is further divided into four subquadrants. Thus, quadrant 32 of FIG. 2 includes subquadrants 40, 42, 44 and 46. The threshold values are arranged in order of increasing magnitude in alternating diagonally opposing pairs of subquadrants for bi-lateral symmetry. For example, the values may be arranged in the subquadrants in the order of the upper-left subquadrant 40, the lower-right subquadrant 44, the upper-right subquadrant 42, and the lower-left subquadrant 46. Any other subquadrant could also be used as a starting point. In addition to providing bi-lateral symmetry, this order of arrangement balances the distribution of dots in a cluster around the origin where the four subquadrants meet.

Within each subquadrant, the values are arranged in order of increasing magnitude beginning with the element nearest the origin and then alternating along the sides of the concentric squares centered at the origin. FIG. 3 shows completed concentric squares with threshold values of 4, 16, 36 and 64. The subquadrants are filled with threshold values one at a time, beginning with a first subquadrant which, by way of example, may be the upper-left subquadrant. Once the upper-left subquadrant 40 is filled with values, the remaining subquadrants 42, 44 and 46 are formed by rotating the first subquadrant 40 around the origin (dot cluster center) with the threshold values being incremented accordingly in the order of dot cluster growth. Thus, the lower-right subquadrant 44 is the upper-left subquadrant 40 rotated 180 degrees with the values incremented by one. Similarly, the upper-right subquadrant 42 is the upper-left subquadrant 40 rotated 90 degrees with the values incremented by two. The lower-left subquadrant 46 is the upper-right subquadrant 40 rotated 270 degrees with the values incremented by three. By growing the dot clusters in this manner, the shapes remain symmetrically well-balanced and are not subjectively distracting.

As dots are added to a dot cluster, the majority of the dots that are added to complete a concentric square are added so as to have two sides that are adjacent to the sides of previously placed dots, as illustrated in FIG. 3. The exceptions are the first two dots of a cluster or quadrants 32 and 35 (no sides adjacent), and the first four dots of each concentric square (one side adjacent). For quadrants 34 and 38, the exceptions are the last two dots (all four sides adjacent), and the last four dots of each concentric square (three sides adjacent). The average number of adjacent sides is always two regardless of the matrix size. This method of adding dots to a cluster minimizes the darkening effect of dots spread for devices that do not produce ideal PELs of perfectly square dots while maintaining cluster symmetry.

Figure 4:
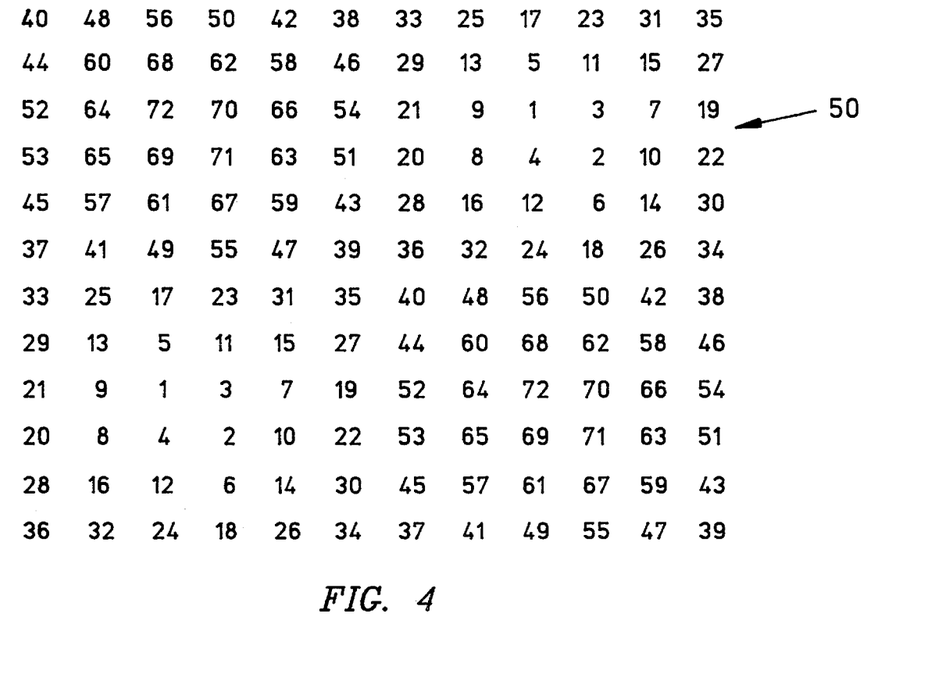
FIG. 4 is a 12×12 threshold matrix constructed in accordance with the present invention.
Figure 5:
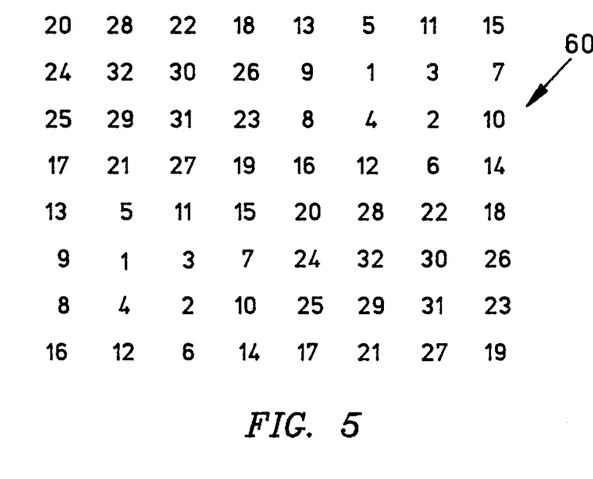
FIG. 5 is an 8×8 threshold matrix constructed in accordance with the present invention.
Figure 6:
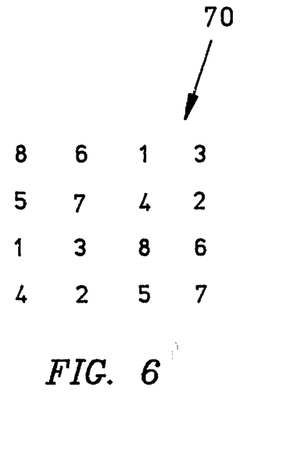
FIG. 6 is a 4×4 threshold matrix constructed in accordance with the present invention.

Because the matrix is divided into quadrants and each quadrant is divided in subquadrants, the side of a matrix is a multiple of four. As discussed in more detail below, this allows the use of a multiplier parameter during matrix formation for adjusting the size of the threshold matrix as required to accommodate the number of threshold levels quantized in the input image. The smallest matrix with a multiplier of one is 4×4 (sixteen elements with nine threshold levels). The next matrix with a multiplier of two is 8×8 (sixty-four elements with thirty-three threshold levels). The next threshold matrix with a multiplier of three is 12×12 and so forth. FIG. 4 illustrates a 12×12 threshold matrix 50, FIG. 5 illustrates an 8×8 threshold matrix 60 and FIG. 6 illustrates a 4×4 threshold matrix 70.

In some applications, it may be desirable to store threshold matrices of different sizes. A particular threshold matrix to be used could be selected by determining the number of intensity thresholds present in the input image. For high quality images, the threshold matrix should be large enough to accommodate all of the quantized input intensity levels. In other applications, it may be desirable to generate threshold matrices each time an image conversion session is conducted. To do so requires an efficient procedure for generating threshold matrices of selected size.

Referring now to FIGS. 7A–7D, a flow diagram representing a procedure for generating threshold matrices of selected size, and for converting a continuous tone input image into a bi-level output image, is illustrated. The matrix formation and image conversion procedure can be implemented by a software program which is resident in the program memory 26 and executed by the data processing system 18. The program does not require any particular operating system or programming language, although the PL/I programming language has been used advantageously to generate threshold matrices in accordance with the invention. Each threshold matrix is defined in the program memory 26 as a two-dimensional array of storage positions for storing threshold values. The procedure effectively defines and divides the two-dimensional array into four quadrants of equal size. Each quadrant has a quadrant origin, a quadrant perimeter, and four subquadrants disposed around the quadrant origin. Threshold values are assigned to the storage positions of each quadrant and subquadrant. The values in each threshold matrix represent the order of how output PELs are displayed or printed for successive thresholds. The values for the ordered positions in the matrix are determined by the image processing program that uses the matrix. For example, the values may range from zero to 255 when processing image data that uses eight bits per picture element to represent intensity. In that case, a 24×24 threshold matrix is required if each incremental intensity value is to be represented by a threshold value. Alternatively, a smaller matrix could be used with the threshold matrix values being assigned in increments of greater than one.

An advantage of the procedure of FIGS. 7A–7D is that a threshold matrix can be generated dynamically depending on the range of intensity values determined from the input image. This may involve a calculation to map an intensity value from the range of input intensity values to the range of threshold values provided by the matrix size being used. For example, the input values of zero through 255 may be spread linearly across the 289 gray levels possible with a 24×24 matrix or reduced to the 33 gray levels possible with an 8×8 matrix. Thus, there is no need to store a large number of matrices in memory to handle the variety of electronic files likely to be input to the system. The procedure commences at step 100 of FIG. 7A when an input array of intensity values representing a continuous tone image is provided to the data processing system 18. In step 102, the range of intensity levels in the input image are determined. Although this number will usually be the same for all images input through the scanner/digitizer 12, it may be different for each electronic document input through the input port 15. In step 104 of the procedure, the required matrix size is determined by subtracting one from the determined number of intensity levels in the input image and multiplying by two. In step 106, a matrix size multiplier value is calculated from the matrix size. It is determined by dividing the length of any side of the threshold matrix (i.e., the square root of the matrix size value) by four. When the square root of the matrix size value is determined and divided by four, if the result is not an integer, then the next larger number that is an integer is the matrix size multiplier. For example, if the values of the image data range from zero to 255, there are 256 intensity levels. Subtracting one gives 255 and multiplying by two gives 510. The square root of 510 is approximately 22.583 and dividing that by 4 gives approximately 5.65 which is not an integer. The next larger number that is an integer is six which is the matrix size miltiplier to use. A multiplier of six gives a 24×24 matrix which provides 289 threshold values.

The matrix generating procedure is thereafter performed in three steps. The first step is used to generate the first subquadrant of the first quadrant of the threshold matrix, which by way of example, may be the upper-left subquadrant of the upper-right quadrant, such as subquadrant 40 in FIG. 2. The second step calculates the remaining subquadrants of the first quadrant, while the third step generates the remaining quadrants of the matrix, in this case the upper-left, lower-right and lower-left quadrants. A preferred implementation of the first step 108 of the matrix generating procedure is illustrated below in pseudocode format:

```
1:   do row = 1 to multiplier;
2:     do column = 1 to multiplier;
3:       select;
4:         when (column < row) do;
5:           element = (row-1)**2 + 2*(column-1) + 1;
6:         end;
7:         when (column = row) do;
8:           element = column*row;
9:         end;
10:        when (column > row) do;
11:          element = (column-1)**2 + 2*row;
12:        end;
13:      end;
14:      element = (element-1)*4 + 1;
15:      matrix(multiplier-row+1, 3*multiplier-column+1)
16:        = element;
17:    end;
18:  end;
```

The pseudocode, as well as that of the second and third steps of the procedure is based on a program written in the PL/I programming language. Step 108 of the procedure uses the size multiplier in calculating the size of the matrix and the matrix positions to be filled by the first subquadrant of the first quadrant. The size of the subquadrant is determined from the matrix size multiplier. Thus, for a 16×16 matrix as in FIG. 2, each subquadrant is a 4×4 matrix. For a 12×12 matrix as in FIG. 4, each subquadrant is a 3×3 matrix. For an 8×8 matrix as in FIG. 5, each subquadrant is a 2×2 matrix. And for a 4×4 matrix as in FIG. 6, each subquadrant is a 1×1 matrix. The matrix size is reflected in lines 1 and 2 of the pseudocode. Pseudocode lines 1 and 2 represent a pair of nested loop statements revealing that the first subquadrant matrix is built row by row, with each row containing one or more columns. The starting point of the subquadrant relative to the entire threshold matrix is shown from line 15 of the pseudocode. In the case of matrix 30 of FIG. 2, the first subquadrant is the upper-left subquadrant 40 of the upper-right quadrant 32. The starting point is the lower-right hand corner of the subquadrant 40. The initial row coordinate value is equal to the multiplier. Moreover, because the upper-left subquadrant of the upper-right quadrant is always the third subquadrant from the left-hand side of the threshold matrix, the initial column position is three times the multiplier. Successive subquadrant positions are filled row by row from the bottom to the top of the subquadrant in a left to right horizontal scanning direction, as shown in line 15 of the pseudocode. Other subquadrant filling sequences could also be used.

Lines 3 through 14 of the pseudocode determine the threshold values placed in each subquadrant position. These values are based on the geometry of the matrix. Because the subquadrant is one of four subquadrant matrices in a quadrant, the threshold values of each subquadrant of a quadrant differ by increments of four. Moreover, the threshold values are positioned so that the resultant dot clusters generate successively larger concentric squares centered at the quadrant origin. The threshold values are assigned beginning with the position nearest the quadrant origin and then alternating along the sides of the concentric squares centered at the origin. The values at each position of the first subquadrant are determined using the row and column position of each value. Three different formulas are used to determine (1) values along the diagonal extending upward and leftward from the origin, (2) values above the diagonal, and (3) values below the diagonal. Line 4 through 6 of the pseudocode are used to find threshold values for the positions below the diagonal. Lines 7 through 9 are used to find threshold values along the diagonal. Lines 10 through 12 are used to find threshold values above the diagonal.

Each threshold value is determined by its position relative to the matrix origin. Each formula simulates a counting of subquadrant positions, from the matrix origin until the position of interest is reached. This counting process, illustrated as step 110 in FIG. 7A, proceeds outwardly from the matrix origin, filling one concentric square at a time. Each concentric square is filled by a alternately filling positions along the sides thereof, beginning with the rightmost position on the upper horizontal side, followed by the bottommost position of the left vertical side, and so on. For example, the value "41" in the subquadrant 40 of FIG. 2 is reached after a count of eleven. Starting from the origin of quadrant 32, the positions included in the count, listed by their corresponding threshold value, are 1, 5, 9, 13, 17, 21, 25, 29, 33, 37 and 41. To find the threshold value at the eleventh position, the count value 11 is decremented by one and multiplied by four in step 112 of FIG. 7B. In step 114, this value is added to the initial subquadrant value of one, for a total of 41. The remaining subquadrant values are similarly determined. Thus, the position of the threshold value 37 in FIG. 2 is reached after a count of ten from the quadrant origin. Decrementing one and multiplying by four yields 36, and adding the origin value of one gives a threshold value of 37. Similarly, the position occupied by the threshold value 61 in FIG. 2 is reached after a count of sixteen from the quadrant origin. Decrementing by one, multiplying by four and adding one yields the threshold value 61. It will be seen that the expressions in lines 3 through 14 of the pseudocode calculates these threshold values in the manner set forth above.

The second step of the matrix generating procedure is shown in pseudocode form, as follows:

```
19:  do row = 1 to multiplier;
20:  do column = 1 to multiplier;
21:      matrix(row, 3*multiplier+column) =
22:          matrix(multiplier-column+1, 2*multiplier+row) +2;
23:      matrix(multiplier+row, 3*multiplier+column) =
24:          matrix(multiplier-row+1, 3*multiplier-column+1)
             +1;
25:      matrix(multiplier+row, 2*multiplier+column) =
26:          matrix(column, 3*multiplier-row+1) +3;
27:  end;
28:  end;
```

Figure 7A:
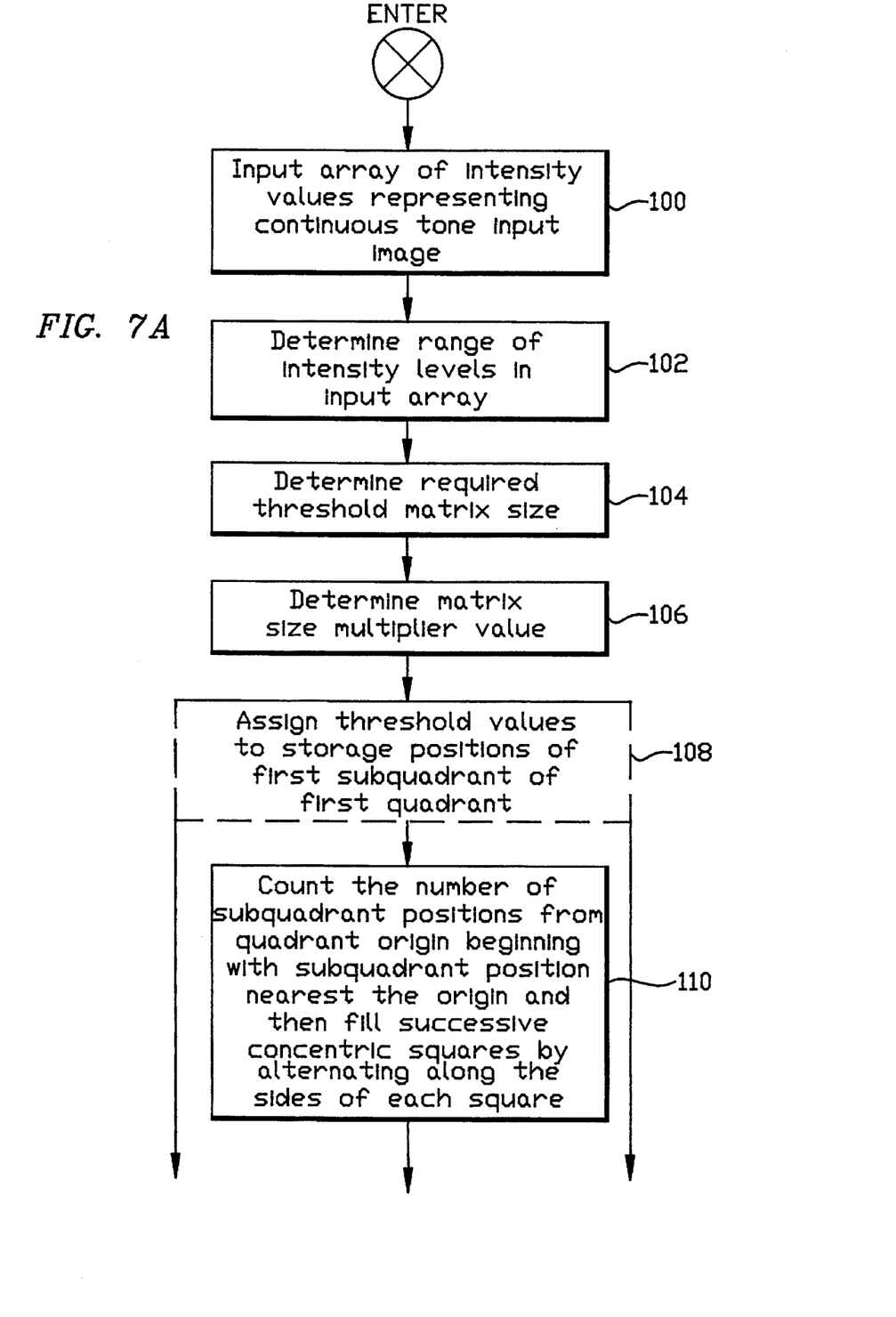
FIGS. 7A–7D represent a flow diagram of a method for generating threshold matrices in accordance with the present invention.
Figure 7B:
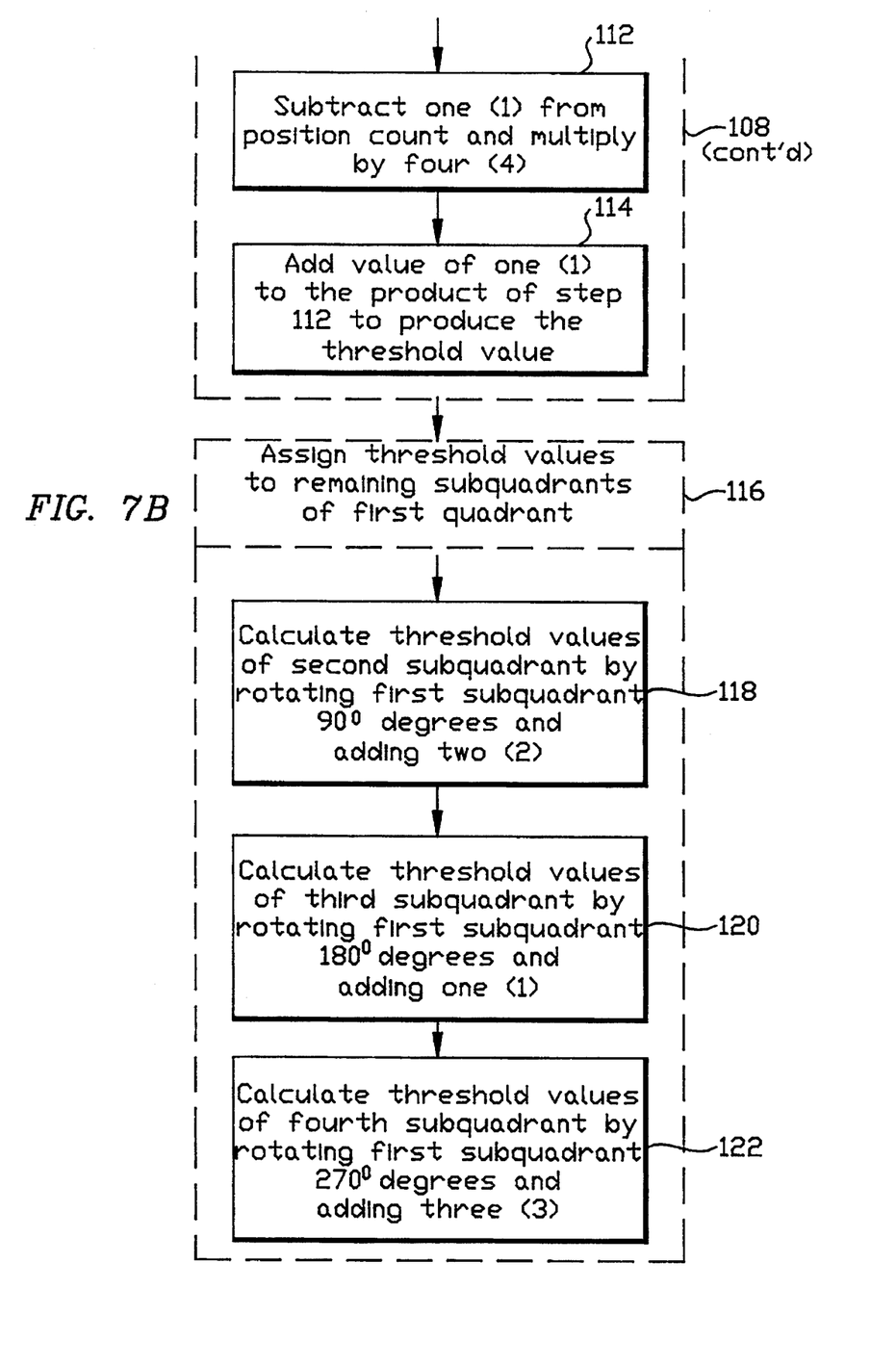

In this step, illustrated as step 116 in FIG. 7B, the subquadrant generated in step 108 is used to generate the remaining subquadrants of the upper-right quadrant of the * lower-left quadrant (identical to the upper-right quadrant) */

```
39:  do row = 2*multiplier+1 to 4*multiplier;
40:  do column = 1 to 2*multiplier;
41:      matrix(row, column) = matrix(row-2*multiplier,
42:          2*multiplier+column);
43:  end;
44:  end;
```

Lines 29–38 of the pseudocode contain formulas for generating the upper-left and lower-right quadrants of the threshold matrix. Lines 33–34 generate the upper-left quadrant by subtracting the values at corresponding positions of the upper-right quadrant from a value representing the total number thresholds of the matrix. This is illustrated in step 126 in FIG. 7C. Lines 35–36 of the pseudocode generate the lower-right quadrant by duplicating the upper-left quadrant. This is shown in step 128 in FIG. 7C. Lines 39–42 of the pseudocode generate the lower-left quadrant by duplicating the upper-right quadrant. This is shown in step 130 in FIG. 7C.

Figure 7C:
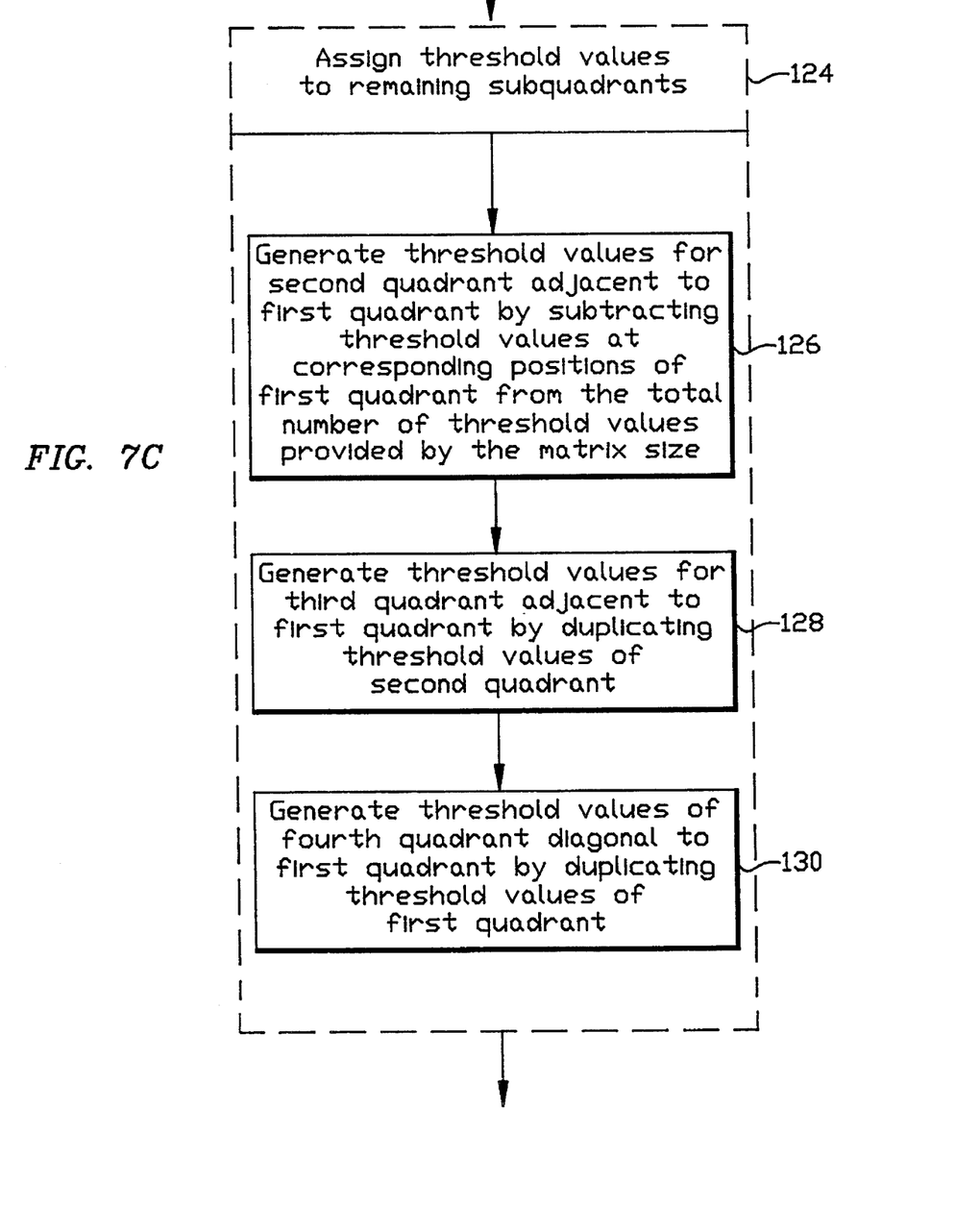
Figure 7D:
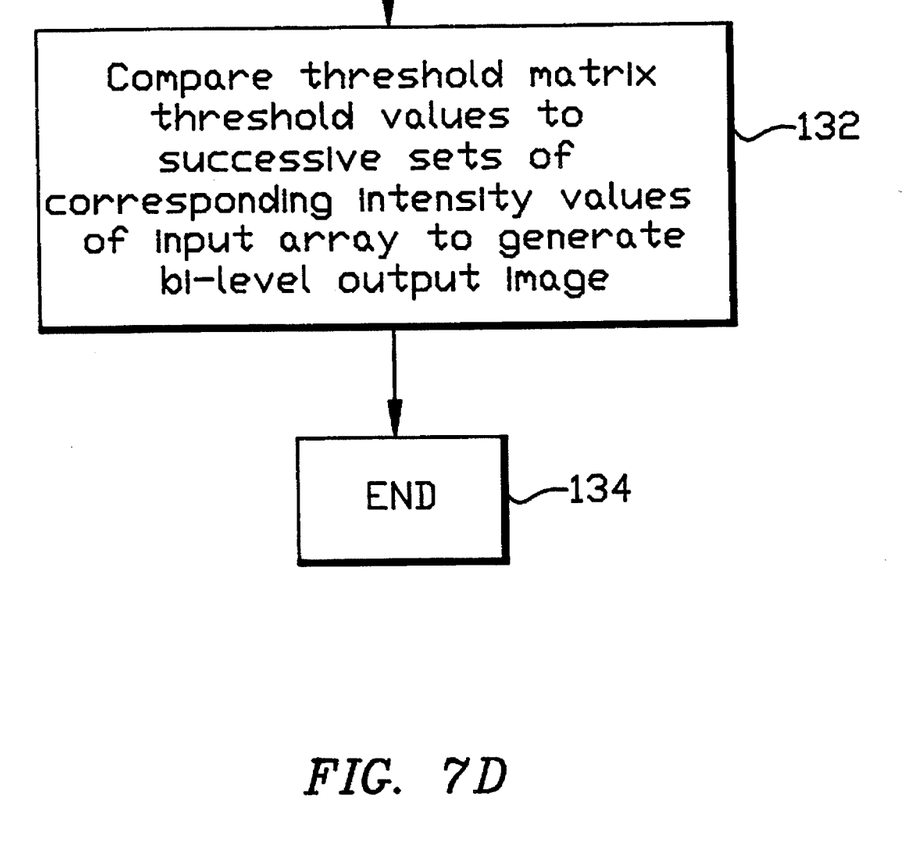

The image conversion process is completed in step 132 of FIG. 7D by tiling the threshold matrix over the input image array to generate a plurality of dot clusters forming the bi-level output image. The dot clusters are formed, as indicated, by comparing the threshold values to corresponding intensity values of the input image. If color imaging is desired, the threshold matrix is applied to each of the color input arrays (typically there are three per image). The bi-level patterns of dot clusters are then threshold matrix. Lines 21–22, shown as step 118 in FIG. 7B, calculate threshold values for the upper-right subquadrant. The values determined for this subquadrant are found by rotating the first subquadrant matrix 90 degrees and adding a value of two. Lines 23–24 of the pseudocode and step 120 of FIG. 7B calculate threshold values for the lower-right subquadrant. These values determined for the subquadrant are found by rotating the first subquadrant matrix 180 degrees and adding a value of one. Lines 25–26 of the pseudocode and step 122 of FIG. 7C calculate threshold values for the lower-left subquadrant. These values are found by rotating the first subquadrant matrix 270 degrees and adding a value of three.

The third step of the matrix generating procedure, shown as step 124 in FIG. 7C, calculates threshold values for the remaining quadrants. This step is set forth in pseudocode form, as follows:

```
/* upper-left quadrant and lower-right quadrant
29:  matrix_side =   4*multiplier; */
30:  thresholds = (matrix_side**2/2) +1;
31:  do row = 1 to 2*multiplier;
32:  do column = 1 to 2*multiplier;
33:      matrix(row, column) = (thresholds - matrix(row,
34:          2*multiplier+column);
35:      matrix(2*multiplier+row, 2*multiplier+column)
36:          = matrix(row, column);
37:  end;
38:  end;
``` overlaid to provide a three-color output image pattern. With the bi-level output image being generated, the procedure terminates in step 134.

It will be appreciated that various modifications could be made to the procedure described above. For example, instead of using a dynamic procedure to create threshold matrices of desired size, threshold matrices of commonly used sizes could be constructed and stored in the program memory 26 to be used by the data processing system 18. Also, in the matrix generating procedure itself, instead of starting the dot cluster pattern in the upper-right and lower-left quadrants, the left and right halves or the top and bottom halves of the matrix can be swapped so that the dot clusters begin with the upper-left and lower-right quadrants. These substitutions still maintain the 45-degree angle of the dot clusters. Also, the entire matrix can be reflected along the x-axis or y-axis or both and the desired angle of the dot clusters as well as other properties in the matrix will be maintained. As long the remaining three quadrants are derived by copying and subtraction of the element values in one quadrant, that one quadrant can be constructed so that it is rotated by 90, 180 or 270 degrees. As long as the threshold values are assigned to the subquadrants in alternating diagonals (which is maintained by the rotation), the symmetry of the dot clusters is maintained. Likewise, as long as the remaining subquadrants are derived by incrementing the values of one subquadrant and rotating it to the alternative diagonal positions, that one subquadrant could be generated so that it is reflected along the line bisecting it from the origin of the subquadrants.

Still further, instead of a parameter that reflects a multiplier used to determine the size of the matrix, other parameters could be used such as the desired number of threshold values. A procedure could also be added to determine the matrix size needed to have at least as many threshold values as indicated by the parameter.

The dot cluster can also be grown so that concentric rectangles are added. However, the best results are obtained when concentric squares are used. Also with the use of concentric rectangles, the size of the threshold matrix is not limited to a multiple of four as the length of a side. However, the best results are obtained when a square matrix is used and the length of a side of a matrix is a multiple of four. This maintains the best symmetry for the growth of dot clusters. The addition of PELs to a dot cluster does not have to be two at a time to grow two dot clusters simultaneously. One PEL could be added to one quadrant and then to the matching quadrant in an alternating pattern. By doing this, the number of dot patterns for a matrix is doubled. This increases the number of different densities with threshold values that can be represented by the matrix. The best results, however, are obtained when two dots are added to a matrix for each threshold value. This avoids the addition of a low frequency component to the dot cluster pattern.

As dots are added to the sides of a dot cluster rectangle to form the next concentric rectangle or layer, they do not have to be added from the middle of the sides. However, the best results are obtained when the dots are added to the middle of the sides to minimize the appearance of artifact patterns. Still further, the angled quadrants do not have to be at 45 degrees. However, the best results are obtained when 45-degree angles are maintained to minimize the perception of dot clusters as horizontal and vertical lines. Moreover, for color printing, the colored planes do not have to be aligned at the same angle. However, for good registration, the best results are obtained when the same angle is used for the color planes.

It may also be possible to form dot clusters to resemble circles. However, the number of exposed edges of the individual square dots increases. For displaying print mediums that are not perfect and the individual dots are not perfect squares, there is dot spread into surrounding dot positions. This spread results in an undesirable increase in density. When dots are arranged as concentric rectangles, the number of exposed edges is minimized. When a square dot cluster is compared to a circular dot cluster, the difference is the additional area at the corners of the square and less at the sides of the square. The result is that color density is emphasized along the 45-degree angles. This contributes to minimizing the unwanted perception of vertical and horizontal lines when a gray area is represented by dot clusters.

Thus, a method for generating digital halftone images has been disclosed. Although several preferred embodiments have been shown and described, it should be understood that modifications and adaptations thereof will occur to persons skilled in the art. Therefore, the protection afforded the invention should not be limited except in accordance with the spirit of the following claims.

I claim:

1. In a computer system including a central processing unit and a memory, a method executable on said computer system for generating digital halftone matrices of selected size for use in an image processing procedure in which bi-level output images are formed from continuous tone input images using the digital halftone matrices, said method comprising the steps of:

defining a two-dimensional array of storage positions in said memory for storing threshold values;

dividing said two-dimensional array into four quadrants of equal size, each quadrant having a quadrant origin, a quadrant perimeter and four subquadrants disposed around the quadrant origin;

assigning threshold values to the storage positions of said quadrants, said threshold values being arranged in a first pair of diagonal quadrants in order of increasing magnitude from the quadrant origin toward the quadrant perimeter, and said threshold values being arranged in a second pair of diagonal quadrants in order of increasing magnitude from the quadrant perimeter toward the quadrant origin; and said threshold values being arranged in said quadrants in order of increasing magnitude in alternating pairs of diagonally opposing subquadrants to provide bi-lateral symmetry in each quadrant.

2. The method of claim 1 wherein the step of assigning threshold values to storage positions of the first and second pairs of diagonal quadrants includes assigning, for each pair of diagonal quadrants, the same threshold values to corresponding storage positions of the diagonal quadrants.

3. The method of claim 1 wherein threshold values are arranged in the subquadrants of each quadrant in the order of upper-left subquadrant, lower-right subquadrant, upper-right subquadrant, and lower-left subquadrant.

4. The method of claim 1 wherein threshold values are assigned in a first one of said quadrants to a first subquadrant beginning with an initial storage position nearest the quadrant origin followed by assignment in order of increasing magnitude to storage positions along sides of concentric squares lying partially within the first subquadrant and centered at the quadrant origin.

5. The method of claim 4 wherein the threshold values are assigned in order of increasing magnitude to storage positions along alternating sides of the concentric squares toward corner storage positions of the concentric squares which are diagonally opposed to the initial subquadrant storage position.

6. The method of claim 5 wherein said threshold values are incremented by a value of four (4) at each successive storage position of the subquadrant.

7. The method of claim 6 further including the step of assigning threshold values to the remaining subquadrants of the first one of said quadrants by rotating the first subquadrant around the quadrant origin and incrementing the threshold values.

8. The method of claim 7 wherein a second subquadrant is assigned threshold values by rotating the first subquadrant 180 degrees and incrementing the threshold values by one (1), wherein a third subquadrant is assigned threshold values by rotating the first subquadrant 90 degrees and incrementing the threshold values by two (2), and wherein a fourth subquadrant is assigned threshold values by rotating the first subquadrant 270 degrees and incrementing the threshold values by three (3).

9. The method of claim 8 wherein successive quadrants are assigned threshold values by duplicating the threshold values assigned to the first quadrant and by subtracting each threshold values assigned to the first quadrant from a value representing a total number of thresholds contained in the threshold matrix.

10. The method of claim 1 further including the step of determining a size of the two-dimensional array using a multiplier.

11. In a processor including a central processing unit, a memory and a process means for generating output images, a method, executable on said processor for generating bi-level output images from continuous tone input images, comprising the steps of:

provinding an input array of image intensity values representing a continuous tone input image;

determining a range of image intensity values in said input array;

determining from said range of image intensity values a threshold matrix size value;

generating a threshold matrix of a size corresponding to said threshold matrix size value for thresholding said input array, said threshold matrix being generated by the steps of:

defining a two-dimensional array of memory storage positions for storing threshold values;

dividing said two-dimensional array into four quadrants of equal size, each quadrant having a quadrant origin, a quadrant perimeter and four subquadrants disposed around the quadrant origin;

assigning threshold values to the memory storage positions of said quadrants, said threshold values being arranged in a first pair of diagonal quadrants in order of increasing magnitude from the quadrant origin toward the quadrant perimeter, and said threshold values being arranged in a second pair of diagonal quadrants in order of increasing magnitude from the quadrant perimeter toward the quadrant origin;

said threshold values being arranged in said quadrants in order of increasing magnitude in alternating pairs of diagonally opposing subquadrants to provide bi-lateral symmetry in each quadrant; and comparing threshold values of the threshold matrix to corresponding intensity values of the input array, and if said intensity values exceed said threshold values, generating a first set of bi-level image values, otherwise, if said intensity values do not exceed said threshold values, generating a second set of bi-level image values, said first and second sets of bi-level image values defining light and dark image components of an output bi-level image.

12. The method of claim 11 wherein the step of assigning threshold values to storage positions of the first and second pairs of diagonal quadrants includes assigning, for each pair of diagonal quadrants, the same threshold values to corresponding storage positions of the diagonal quadrants.

13. The method of claim 11 wherein threshold values are arranged in the subquadrants of each quadrant in the order of upper-left subquadrant, lower-right subquadrant, upper-right subquadrant, and lower-left subquadrant.

14. The method of claim 11 wherein threshold values are assigned in a first one of said quadrants to a first subquadrant beginning with an initial storage position nearest the quadrant origin followed by assignment in order of increasing magnitude to storage positions along sides of concentric squares lying partially within the first subquadrant and centered at the quadrant origin.

15. The method of claim 14 wherein the threshold values are assigned in order of increasing magnitude to storage positions along alternating sides of the concentric squares toward corner storage positions of the concentric squares which are diagonally opposed to the initial subquadrant storage position.

16. The method of claim 15 wherein said threshold values are incremented by a value of four (4) at each successive storage position of the subquadrant.

17. The method of claim 16 further including the step of assigning threshold values to the remaining subquadrants of the first one of said quadrants by rotating the first subquadrant around the quadrant origin and incrementing the threshold values.

18. The method of claim 17 wherein a second subquadrant is assigned threshold values by rotating the first subquadrant 180 degrees and incrementing the threshold values by one (1), wherein a third subquadrant is assigned threshold values by rotating the first subquadrant 90 degrees and incrementing the threshold values by two (2), and wherein a fourth subquadrant is assigned threshold values by rotating the first subquadrant 270 degrees and incrementing the threshold values by three (3).

19. The method of claim 18 wherein successive quadrants are assigned threshold values by duplicating the threshold values assigned to the first one of said quadrants and by subtracting each threshold value assigned to the first quadrant from a value representing a total number of thresholds contained in the threshold matrix.

20. The method of claim 11 wherein said step of obtaining said threshold matrix includes said steps of generating said threshold matrix.

21. A digital matrix filter for converting a continuous tone input image to a bi-level output image, comprising:

a data storage medium providing a two-dimensional array of storage positions for storing intensity threshold values;

first process means for dividing said two-dimensional array into four quadrants of equal size, each quadrant having a quadrant origin, a quadrant perimeter and four subquadrants disposed around the quadrant origin;

second process means for arranging threshold values in said storage positions of said quadrants, said threshold values being arranged in a first pair of diagonal quadrants in order of increasing magnitude from the quadrant origin toward the quadrant perimeter, and said threshold values being arranged in a second pair of diagonal quadrants in order of increasing magnitude from the quadrant perimeter toward the quadrant origin; and third process means for arranging said threshold values in said quadrants in order of increasing magnitude in alternating pairs of diagonally opposing subquadrants to provide bi-lateral symmetry in each quadrant.

22. A computer program product operable in a computer system including a central processing unit and a memory, for generating digital halftone matrices of selected size for use in an image processing procedure in which bi-level output images are formed from continuous tone input images using the digital halftone matrices, said computer program product comprising:

a data storage medium for storing digital information;

means recorded on said data storage medium for causing said computer system to generate a two-dimensional array of storage positions in said memory for storing threshold values;

means recorded on said data storage medium for causing said computer system to divide said two-dimensional array into four quadrants of equal size, each quadrant having a quadrant origin, a quadrant perimeter and four subquadrants disposed around the quadrant origin;

means recorded on said data storage medium for causing said computer system to assign threshold values to the storage positions of said quadrants, said threshold values being arranged in a first pair of diagonal quadrants in order of increasing magnitude from the quadrant origin toward the quadrant perimeter, and said threshold values being arranged in a second pair of diagonal quadrants in order of increasing magnitude from the quadrant perimeter toward the quadrant origin, said threshold values being arranged in said quadrants in order of increasing magnitude in alternating pairs of diagonally opposing subquadrants to provide bi-level symmetry in each quadrant.

23. The computer program product of claim 22 wherein said means for causing said computer system to assign threshold values to storage positions of the first and second pairs of diagonal quadrants includes means for assigning, for each pair of diagonal quadrants, the same threshold values to corresponding storage positions of the diagonal quadrants.

24. The computer program product of claim 23 wherein threshold values are arranged in the subquadrants of each quadrant in the order of upper-left subquadrant, lower-right subquadrant, upper-right subquadrant, and lower-left subquadrant.

25. The computer program product of claim 24 wherein threshold values are assigned in a first one of said quadrants to a first subquadrant beginning with an initial storage position nearest the quadrant origin followed by assignment in order of increasing magnitude to storage positions along sides of concentric squares lying partially within the first subquadrant and centered at the quadrant origin.

26. The computer program product of claim 25 wherein the threshold values are assigned in order of increasing magnitude to storage positions along alternating sides of the concentric squares toward corner storage positions of the concentric squares which are diagonally opposed to the initial subquadrant storage position.

27. The computer program product of claim 26 wherein said threshold values are incremented by a value of four (4) at each successive storage position of the subquadrant.

28. The computer program product of claim 27 further including means recorded on said data storage medium for causing said computer system to assign threshold values to the remaining subquadrants of the first one of said quadrants by rotating the first subquadrant around the quadrant origin and incrementing the threshold values.

29. The computer program product of claim 28 wherein a second subquadrant is assigned threshold values by rotating the first subquadrant 180 degrees and incrementing the threshold values by one (1), wherein a third subquadrant is assigned threshold values by rotating the first subquadrant 90 degrees and incrementing the threshold values by two (2), and wherein a fourth subquadrant is assigned threshold values by rotating the first subquadrant 270 degrees and incrementing the threshold values by three (3).

30. The computer program product of claim 29 wherein successive quadrants are assigned threshold values by duplicating the threshold values assigned to the first quadrant and by subtracting each threshold values assigned to the first quadrant from a value representing a total number of thresholds contained in the threshold matrix.

31. The computer program product of claim 30 further including means recorded on said data storage medium for causing said computer system to determine a size of the two-dimensional array using a multiplier.

* * * * *